(12) United States Patent
Köpfer et al.

(10) Patent No.: US 9,267,495 B2
(45) Date of Patent: Feb. 23, 2016

(54) ACTUATOR

(71) Applicant: Actuator Solutions GmbH, Gunzenhausen (DE)

(72) Inventors: Markus Köpfer, Stödtlen (DE); Tobias Sonnleitner, Nürnberg (DE)

(73) Assignee: Actuator Solutions GmbH, Gunzenhausen (DE)

( * ) Notice: Subject to any disclaimer, the term of this patent is extended or adjusted under 35 U.S.C. 154(b) by 248 days.

(21) Appl. No.: 14/155,778

(22) Filed: Jan. 15, 2014

(65) Prior Publication Data
US 2014/0202148 A1 Jul. 24, 2014

(30) Foreign Application Priority Data
Jan. 21, 2013 (DE) .......................... 10 2013 100 564

(51) Int. Cl.
*F01B 29/10* (2006.01)
*H02N 10/00* (2006.01)
*F03G 7/06* (2006.01)

(52) U.S. Cl.
CPC ........... *F03G 7/065* (2013.01); *Y10T 29/49874* (2015.01)

(58) Field of Classification Search
CPC ......................... F03G 7/065; Y10T 29/49874
USPC ............... 60/527–529; 310/306–307; 29/452
See application file for complete search history.

(56) References Cited

U.S. PATENT DOCUMENTS

| | | | | |
|---|---|---|---|---|
| 5,478,665 A * | 12/1995 | Burroughs | ............. | G01D 7/005 324/426 |
| 6,016,096 A * | 1/2000 | Barnes | ............... | H01H 61/0107 337/12 |
| 6,653,678 B2 * | 11/2003 | Chidambarrao | .. | H01L 27/10867 257/301 |
| 7,536,228 B2 * | 5/2009 | Shaolian | ............... | A61F 2/2445 607/119 |
| 7,600,301 B2 | 10/2009 | Rudduck et al. | | |
| 7,650,914 B2 | 1/2010 | Bogursky et al. | | |
| 8,051,656 B1 * | 11/2011 | Cripe | ...................... | F03G 7/065 310/307 |
| 2002/0113499 A1 | 8/2002 | vonBehrens et al. | | |
| 2002/0185932 A1 | 12/2002 | Gummin et al. | | |
| 2004/0256920 A1 | 12/2004 | Gummin et al. | | |
| 2012/0174572 A1 | 7/2012 | Clausi et al. | | |

FOREIGN PATENT DOCUMENTS

DE 602005002401 6/2008
JP 2008-038802 2/2008

OTHER PUBLICATIONS

Machine Translation of German Office Action dated Sep. 17, 2013 for German application No. 10 2013 100 564.0.
Office Action dated Sep. 17, 2013 for German application No. 10 2013 100 564.0.
European Search Report for EP 13196191, dated May 21, 2014.

* cited by examiner

*Primary Examiner* — Hoang Nguyen
(74) *Attorney, Agent, or Firm* — Thomas, Karceski & Karmilovich, P.C.

(57) ABSTRACT

The invention refers to an actuator with a movable controlling element (7), a wire-shaped SMA element (2) for moving the controlling element in one direction, on whose at least one wire end (3) a connector (4) having a contact surface (13) and made of an electrically conductive material has been fixed, and a structural part (5) made at least partially from an electrically non-conductive plastic material, that has been provided with a conductive strip (6). The connector (4) is fixed to an area of the structural part made from non-conductive material, whereby as a result of that, the contact surface (13) is maintained in electrically conductive contact with the conductive strip (6).

19 Claims, 6 Drawing Sheets

Figure 7:
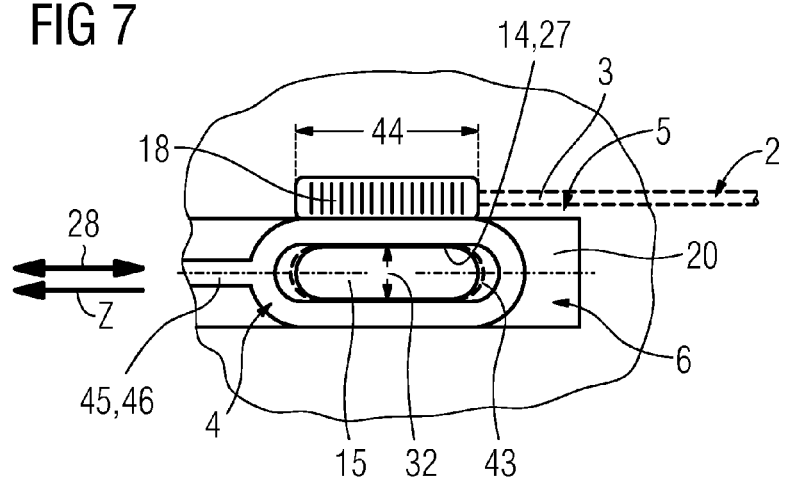

FIG 1
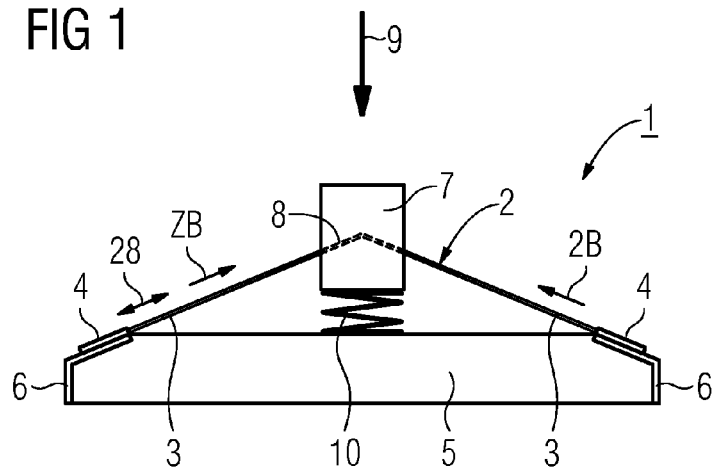
FIG 2
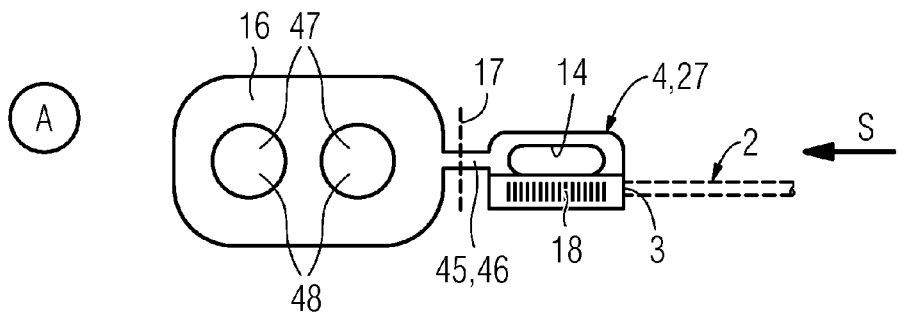
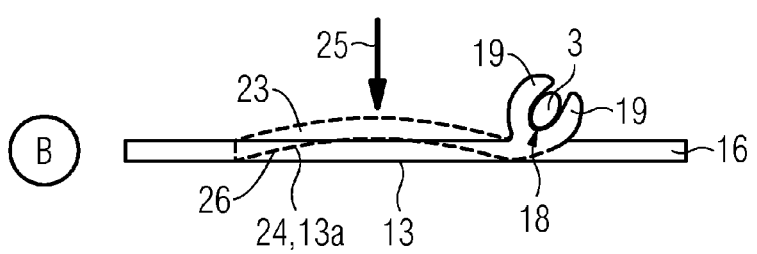

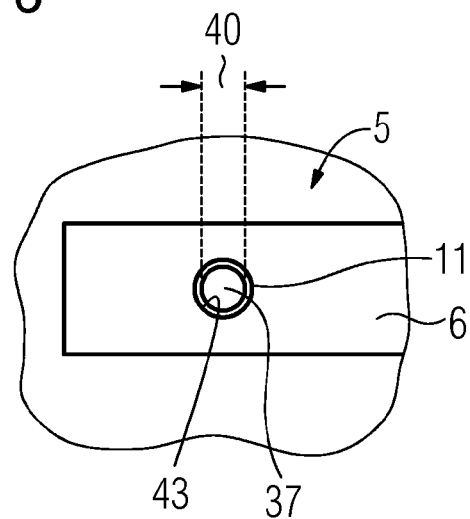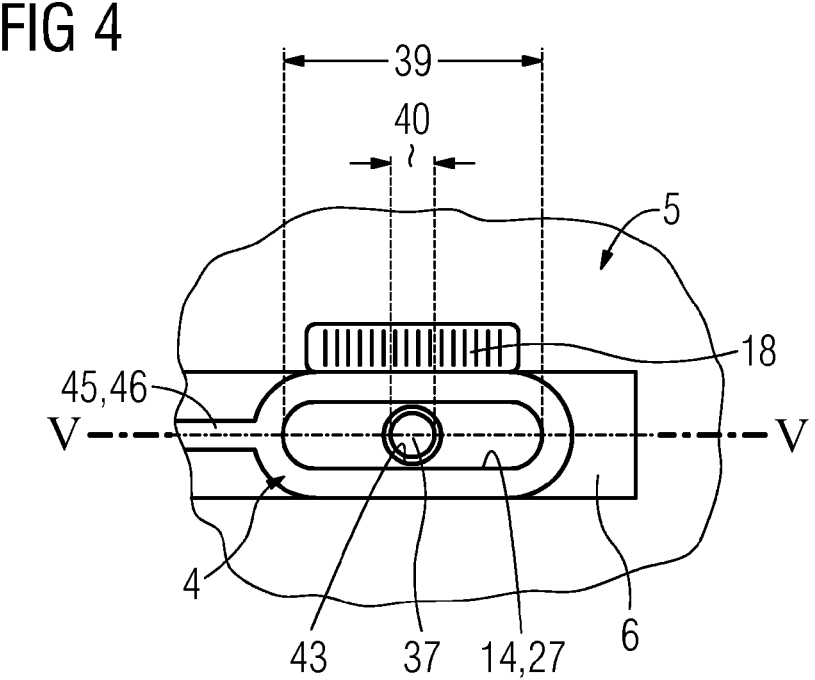

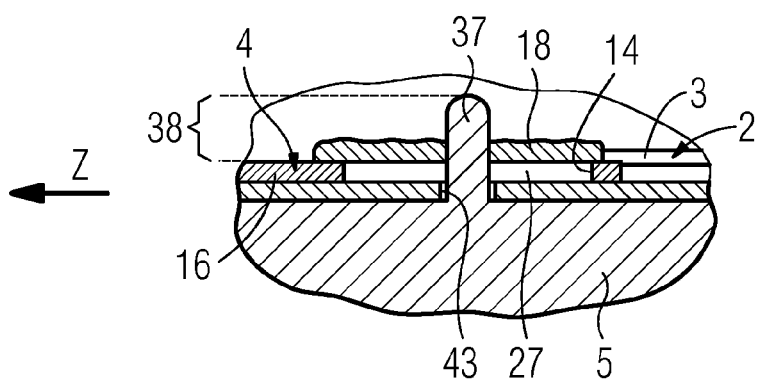
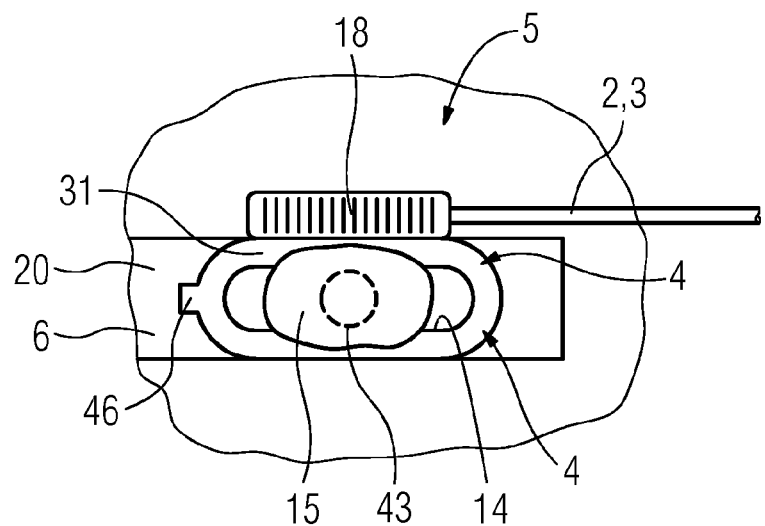

ACTUATOR

The invention refers to an actuator with a movable element or controlling element moved by an SMA element. The SMA element is formed by a shape memory alloy and is an elongated (e.g. wire-shaped) element that will be referred to below. Such an actuator is known, for example, from U.S. 2004/0256920 A1. In at least one of the wire ends of the SMA element, there is a connector, conventionally fixed in place with the help of a crimp connection. The wire end is mechanically and electrically connected with a structural part of the actuator that is at least partially made of an electrically non-conducting material, in which case this structural part can be the actuator's basic frame or housing or even the controlling element itself. The SMA element is energized through the electrical connection and when this occurs, it shortens owing to the phase transition of the shape memory alloy caused by the heating and therefore the controlling element moves or carries out a working stroke. After power interruption and cooling, a transition into the starting phase takes place and the SMA element once again regains its original length, supported by a spring element impinged on the adjusting element against the direction of the working stroke, for example.

So the SMA element can be electrically and mechanically connected to a structural part of the actuator, the connector is customarily fixed to a conducting strip of the structural part with an electrically conducting firm bond by soldering, for example (JP 2008-03 88 02 A, U.S. 2012/ 0174572 A1), or crimping (U.S. Pat. No. 7,650,914 B2, U.S. 2004/0256920 A1). In DE 60 2005 002 401 T2, an actuator of the type described above is fixed to the end of a wire-shaped SMA element with a crimp connector. Hook-shaped elements, in which the crimp connector is suspended (see FIG. 21, for example), have been fitted to the conducting strip for the electrical and mechanical connection to a conducting strip of the actuator. When this occurs, and the connector is at the same time indirectly fixed to the structural part because the conducting strip is connected to the structural part.

So the controlling element's working hub can be accurately controlled, the SMA element must be built into the actuator with a certain pre-stress or connected to a structural part of the actuator with its wire ends. To accomplish this, two assembly variants are currently in use:

In one of the variants, the connector is soldered first to the conducting strip of one structural part of the actuator and then the wire end impinged with tensile force is fixed to a crimp element of the connector. This assembly variant requires a time-consuming process inspection to make sure, first of all, that the maximum stresses of the SMA elements during assembly are not exceed and, secondly, that the SMA element is installed exactly with the given pre-stress.

In the second assembly variant, the connector with its crimping element is already connected to the SMA element when it is being fixed under pre-stress to a structural part of the actuator. The disadvantage of this variant is that it is not possible to control the pre-stress of the SMA element or only with considerable process technology effort. Additionally, there is the risk of exposing the SMA element to excessive thermal stress when the connector is being soldered onto the conducting strip. Although such stress can be prevented by electrically conducting bonding, this once again involves a considerable process technology effort.

The task of the invention is to describe an actuator and an actuator manufacturing method that allow an easy way to precisely adjust the pre-stress of the SMA element.

With regard to an actuator in accordance with claim 1, this task is solved 1 in such a way that the connector is mechanically connected to the non-conducting material of the structural part and remains in electrical contact with the conducting strip by means of a contact area. Contrary to the current actuators of the kind being described here, in which an electrical and mechanical connection is simultaneously ensured by fixing the connector to the conducting strip, in the invention the electrical and mechanical connections are separated from one another: The connector is fixed to a section of the structural part made of electrically non-conducting material with a form-fitting connection, for example, whereby as a result of that another section of the connector—namely its contact surface—is kept in contact with the conducting strip. In other words, the contact surface is pressed against the conducting strip, thus creating in this way an electric contact between connector and conducting strip.

Whereas in conventional actuators practically only one soldering connection that exposes the SMA element to thermal stress is considered in case the wire ends are fixed to the connector by crimping, with an actuator according to the invention several connection options are provided that expose the SMA element to no heat or very little heat compared to a soldering connection.

It is also advantageous that connector and conducting strip can act together during assembly within the meaning of a pairing, so that the connector can be moved easily with respect to the conducting strip while adjusting the pre-stress of the SMA element. As soon as the SMA element has the desired pre-stress, the connector is mechanically fixed to the electrically non-conducting material of the structural part.

With regard to a method for manufacturing or assembling an actuator, the task mentioned above is solved according to claim 14. In this method, an SMA element is provided in which at least one of its wire ends already has a connector. This connector is either a separate part fixed to the wire end by crimping or executed as one single part with the SMA element. When we talk about crimping here, we mean a joining method in which the connector or a section thereof undergoes plastic deformation and the wire end is securely clamped in the process.

The SMA element provided with at least one connector is positioned on an actuator in such a way that its contact surface makes contact with the conducting strip of the structural part. The SMA element is pre-stressed by impinging the wire end with a tensile force. During pre-stressing, when the SMA element stretches and while doing so elongates, as appropriate, the conducting strip serves as sliding pad for the connector. Once the target pre-stress of the SMA element is reached, the connector is fixed to the plastic material of the structural part. Owing to this fixation, the electrical contact between the contact surface of the connector and the conducting strip is permanently created without needing a soldering process that would thermally stress the SMA element. The quality of the electrical contact between connector and conducting strip can be optimized, if necessary, with the help of a conductive medium (such as a contact paste, for example) placed between the parts mentioned above. The fixation of the connector to the plastic material of the structural part can be accomplished by using an adhesive or preferably by fusing the plastic material to the SMA element through hot caulking with comparatively low heat input.

The invention will now be explained in more detail using as references the enclosed drawings, which show:

FIG. 1 a strongly schematic illustration of an actuator with an SMA wire, on whose ends a connector has been provided in each case for fixation to a structural part of the actuator, FIG. 2A a top view of a connector, FIG. 2B a side view in the direction of arrow S in FIG. 2A, FIG. 3 a section of a structural part provided with a conducting strip, seen in the direction of arrow III in FIG. 1, in which case, however, the connector has not yet been fixed to the structural part, FIG. 4 the structural part of FIG. 3, but here the connector is shown in the pre-assembled state, in which it rests with a contact surface on the conducting strip, FIG. 5 a profile according to line V-V in FIG. 4, FIG. 6 the structural part of FIG. 3 with a connector fixed to it.

Figure 8:
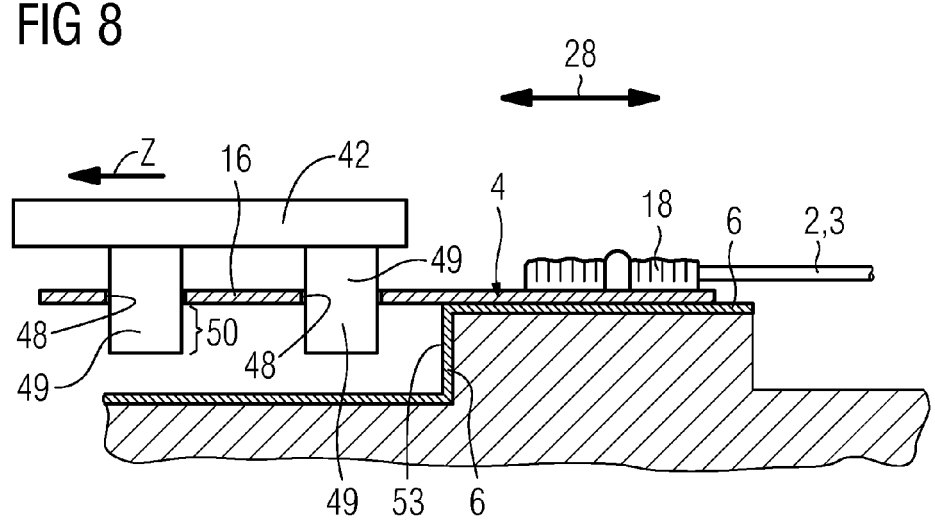
Figure 9:
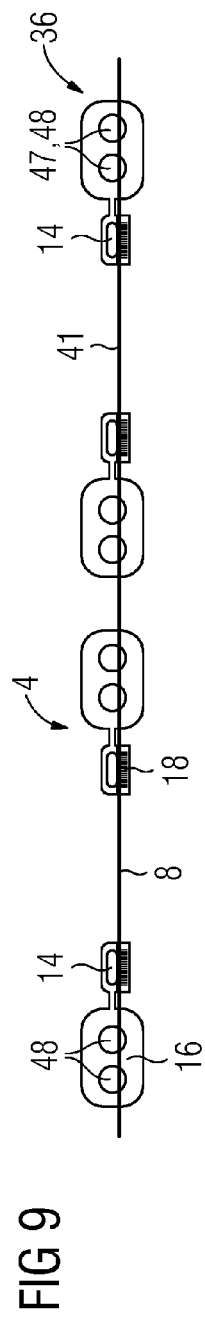
Figure 10:
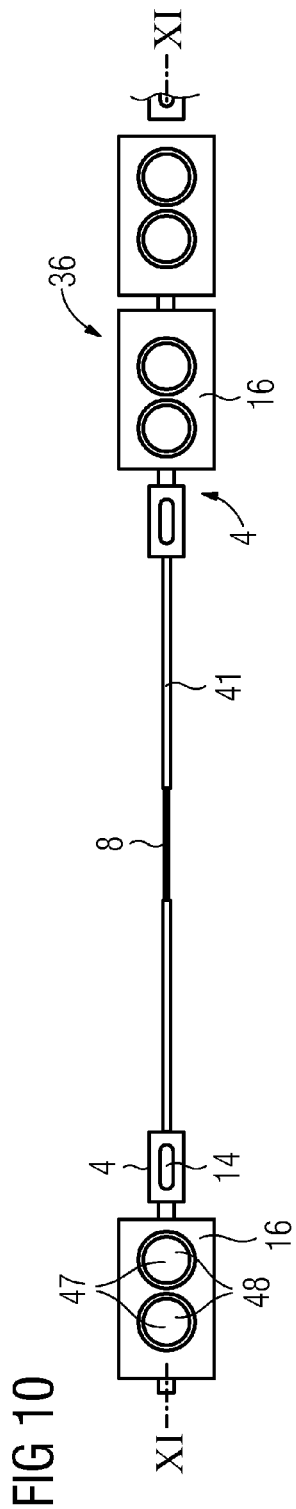
Figure 11:
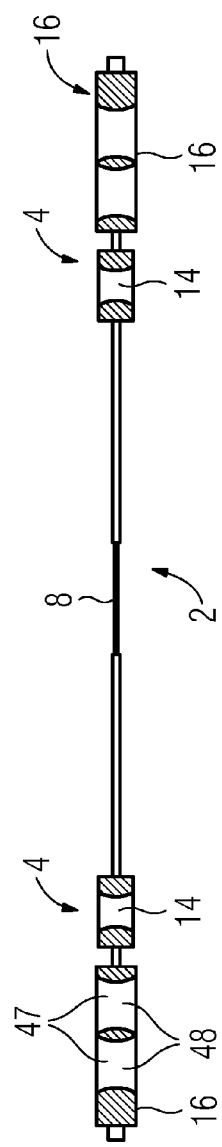
Figure 12:
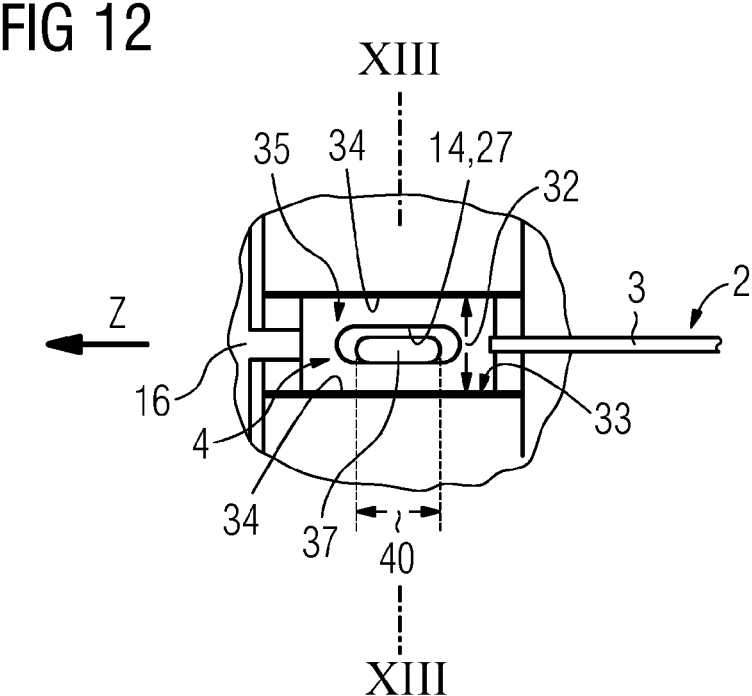
Figure 13:
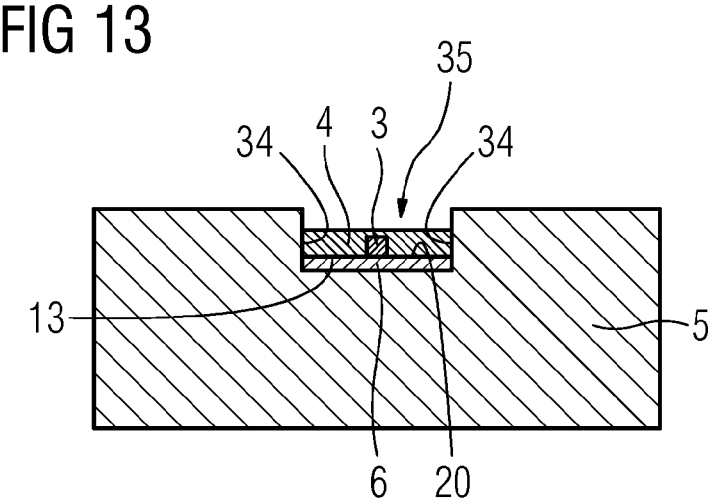

FIG. 7 a structural part with a modified fixation of the connector compared to FIG. 6, shown according to FIG. 3, FIG. 8 a modified structural part shown according to FIG. 3, FIG. 9 a top view of a preliminary product made up of numerous SMA elements, FIG. 10 a modified preliminary product shown according to FIG. 9, FIG. 11 a profile according to line XI-XI in FIG. 10, FIG. 12 an alternately designed structural part shown according to FIG. 3, FIG. 13 a profile according to line XIII-XIII in FIG. 12.

An actuator 1 of the kind described here, shown in FIG. 1 in a strongly schematic way, comprises an elongated SMA element 2 that is preferably executed as a wire with a round cross section shape, for example. The description given below will refer exemplarily to a wire-shaped SMA element 2. If its ends are called wire ends in the description, this also includes the ends of SMA elements that have another shape.

A connector 4 has been fixed in each case on the wire ends 3 of the SMA element 2. At least one connector 4 is connected to a structural part 5 of the actuator 1 in a way to ensure, on the one hand, a mechanical fixation of the wire ends 3 onto the structural part 5 and, on the other hand, an electrical connection with a conductive strip 6 arranged on the structural part 5. The SMA element 2 acts together with a movable part of the actuator 1, hereinafter called controlling element 7. The controlling element 7 is, for example, a valve tappet that controls a valve opening (not shown). A middle section 8 of the SMA element 2 is connected to the controlling element 7 or supports itself on the latter when energized and shortens as a result of this, so that it is able to move or execute a working stroke. In this example, the SMA element 2 is arranged in v-shape, in which case it is moved in the direction of the arrow 9 when the controlling element 7 is shortened. Expediently, the controlling element 7 is impinged by a spring element 10 (for example, by a threaded compression spring) against the movement direction mentioned above and this allows the controlling element to move back to its original position and the SMA element 2 to its original state. The structural part 5 can be, for example, a housing part or also the controlling element 7 itself.

The structural part consists fully or partially of an electrically non-conductive material such as plastic, preferably of a thermoplastic material, and is, regardless of the type of material used, preferably executed as an MID structural part (MID=molded interconnect device). This is a structural part on which an electrically conducting layer forming the conducting strip 6 is applied, for example, with the help of direct laser structuring.

For purposes of the electrical and mechanical fixation of the SMA element 2 onto the structural part 5, at least one of the two connectors 4 is mechanically linked to the electrically non-conducting material of the structural part. The electrical contact needed for energizing the SMA element 2 comes about by providing a contact surface 13 on the connector 4 with which it can rest on the conducting strip 6 assigned to it or is in point-, line- or surface-like contact with it, as a result of which an electrical contact between connector 4 and conducting strip 6 is established.

There is a form- or forced-fitting connection between the connector 4 and the electrically non-conducting material of the structural part 5. This connection acts against a tensile force (e.g. when the actuator 1 is operated), in other words, when the SMA element 2 shortens. To create the form- or forced-fitting connection, the thermoplastic material can be locally softened by controlled laser pulses, for example. By reshaping the softened material, a section of the connector is embedded therein or brought in contact with it. At least one form-fitting connection is preferably accomplished in such a way that the connector 4 is interspersed by an opening 14, which is at least partially filled with plastic material 15 of the structural part 5 (FIG. 6).

A grip element 16 has been provided in a pre-assembled connector 4 for assembly purposes of the SMA element 2. This element is later separated when the SMA element 2 has been fixed to a structural part 5 (this is indicated by the broken line 17 in FIG. 2). The SMA element 2 fixed onto the connector 4 is shown with broken lines in FIG. 2. The grip element 16 is conveniently arranged on the end of the connector 4 that faces away from the SMA element 2.

The mutual fixation of connector 4 and wire end 3 is ensured by a crimp connection. To achieve this, a crimp element 18 has been arranged on the connector 4. For the clamping fixation of the wire end 3, the crimp element 18 comprises two joint latches 19, which clamp the wire end 3 firmly between them after its plastic deformation (FIG. 2B).

In the assembly state shown exemplarily in FIG. 6 (i.e. when the connector 4 has been fixed to the plastic material 15 of the structural part 5 and is electrically connected to the conducting strip), the contact surface 13 provided rests on the conductive strip 6 on the side of the connector 4 facing the structural part 5 or on one of the counter contact surfaces 20 facing the connector 4 of the conductive strip 6 with a contact force. The contact force is made possible by the mechanical connection between the plastic material of the structural part 5 and the connector 4. To counteract subsequent settlement or material fatigue phenomena or for compensating tolerance as well, it is advisable for the connector 4 to support itself spring-like with its contact surface 13 on the conductive strip 6 or counter contact surface 20. This can be ensured, for example, by separate spring elements or a form of the connector acting in spring-like fashion. Preferably, for creating a section of the connector 4 that makes contact with the conductive strip 6, it is foreseen for the connector 4 to be provided with several or one bow-shaped curved leaf springs 23 (FIG. 2B), in which case their side 24 facing the conductive strip 6 rests at least partially on the contact surface 13a and is bent in a concave way, for example. Naturally, other shapes are also conceivable for ensuring a spring function. While mounting the SMA element 2, the leaf spring 23 is impinged with a force in the direction of the arrow 25 and pressed against the conductive strip 6 or counter surface 20. When doing so, the leaf spring 23 flattens, so that at least its lateral surface sections 26—with regard to the longitudinal stretching of the conductive strip 6—extend roughly parallel to the conductive strip 6 and are in surface-, line- or point-like contact with it.

In an especially advantageous embodiment variant, the actuator 1 has been designed in such a way that the opening 14 that it intersperses ends in the contact surface 13. Another opening 43 firmly grips the conductive strip 6, in which case the latter is connected to the opening 14 of the connector 4 (see especially FIGS. 3 to 6). The plastic material 15, which creates the form-fitting connection between connector 4 and structural part 5, extends through the opening 43 and into the opening 14 of the connector 4 (FIG. 6). This embodiment allows a compact connection of the SMA element 2 to the structural part, as the connector at most needs to have a width corresponding to the one of the conductive strip, so that it does not laterally protrude from the conductive strip for the purpose of fixing it to the plastic material of the structural part 5. The opening 43 is preferably dimensioned for this so it can be arranged inside the conductive strip 6 or counter contact surface 20—in other words, that it is circumscribed by an annular closed opening border 11.

In another preferred design of the connector 4, the opening 14 has been executed as a long hole 27 that extends in longitudinal direction 28 of the wire end 3 or in longitudinal direction of the conductive strip. Such a design of the opening 14 is advantageous because during the assembly of the SMA element 2 it allows the connector 4 to be moved in longitudinal direction 28 of the wire end 3 when the pre-stress of the SMA element 2 is being adjusted. The plastic material protruding into the long hole 27 fills it at least partially in such a way that a form-fitting connection is the result. Here and in the other embodiment variants mentioned, this form-fitting connection done with easy assembly techniques accomplishes the sustainability of the pre-adjusted tension of the SMA element, If there is only partial filling, however, the plastic material 15 fills the long hole 27 in its width direction 29, so that at least a frictional and/or material closure is created between the plastic material 15 and the inner wall of the long hole 27. Very generally speaking, the connection between plastic material 15 and connector 4 can still be increased further by roughing up or providing the boundary surfaces of plastic material 15 and/or connector 4 acting together 15 in some other way with structures so they can engage with one another. The plastic material that fills at least partially the long hole 27 or an opening 14 of the connector 4 having another shape other can overlap the hole border section 31 of the connector 4 facing away from the conductive strip 6, as shown in FIG. 6.

The design of the opening 14 as long hole 27 can be used for guiding the connector 4 and the pre-stressing of the SMA element 2 that occurs during it on a motion track running exactly along the longitudinal direction 28 during assembly. Another possibility to accomplish this consists of providing the structural part 5 with a guiding connecting link 33 (FIG. 12) extending at least partially in longitudinal direction of the wire end 3 that contains at least partially the connector 4. The guiding connecting link 33 is preferably formed by a groove 35 with two opposing groove walls 34 flanking the connector 4.

As already mentioned above, the connector 4 is fixed to the SMA element 12 or its wire end 3 with the help of a crimp element 18. In a preferred embodiment, a fixation of this kind is not present. Rather, the connector 4 is executed as one single piece with the SMA element 2 or its wire end 3 (FIGS. 10 to 13). Such an SMA element 2 can, for example, be manufactured through melt spinning. In this process, a melt of a shape memory alloy (e.g. TiNi) is pressed through a nozzle and sprayed on a cooled, rotating drum. From the resulting sliver-shaped SMA element 2, structures are carved out with the help of PEM processes (PEM =precision electro-mechanical etching), namely an SMA element 2, on whose wire ends 3 connectors 2 are located that are preferably additionally provided with grip elements 16.

Regarding a simplification of production, intermediate products 36 from numerous SMA elements 2 are useful, as shown in FIGS. 9 and 10. An intermediate product 36 comprises an SMA wire 41 wound on a spool, if need be, on which connectors 4 are arranged in an SMA element 2 at the corresponding distances.

To manufacture an actuator 1, an SMA element 2 of the kind described above is provided—in other words, one on which at least one connector 4 is arranged on at least one wire end 3 (i.e. executed as one piece with it) or connected through crimping. The SMA element 2 is positioned on the actuator 1 in such a way that the contact surface 13 of the connector 4 rests on the conductive strip 6 of the structural part 5 or on the counter contact surface 20. So an actuator 1 of the kind being described here can operate flawlessly, its SMA element 2 must be fixed onto the actuator 1 or onto a structural part 5 of the actuator 1 with a certain pre-stress. To accomplish this, the SMA element 2 is pre-stressed in controlled fashion by impinging its wire ends with a tensile force Z. As soon as the intended target pre-stress of the SMA element 2 is reached, the connector 4 is fixed onto the structural part 5, in which case this fixation does not take place between the connector 4 and the conductive strip 6, however, but between connector 4 and the plastic material of the structural part 5. To create this connection, a structural part 5 is used consisting at least partially of thermoplastic material, in which case a portion of the plastic material is softened by heat exposure and deformed in such a way that a form- and/or force-fitting connection is created between it and the connector 4.

To create the force and/or form-fitting connection, a structural part (5) is used in a preferred variant of the method that has at least one protuberance 37 made of thermoplastic material. The protuberance is softened and deformed in such a way that the connector 4 is fixed to the structural part 5 in the way described above (i.e. force- and/or form-fitting) with the desired pre-stress of the SMA element 2 on the structural part 5.

In an especially preferred variation of the method, a connector 4 gripped firmly by an opening 14 is positioned in such a way that the protuberance 37 intersperses with the opening 14 of the connector 4 (FIG. 5). The protuberance 37 or its projection 38 protruding from the opening 14 is softened by applying heat and, for example, deformed by hot caulking so that the softened, subsequently hardening thermoplastic material fills the opening 14 at least partially and thus forms the plastic material 15 already mentioned above. When acting together with an opening 14, whose inner diameter 39 (FIG. 4) in longitudinal direction 28 is greater than the dimension 40 (FIGS. 3 & 12) of the protuberance 37 measured in the direction mentioned above, the connector 4 is made mobile while the SMA element 2 is assembled in longitudinal direction 28 in such a way that the desired pre-stress of the SMA element 2 can be adjusted without any problem. A guiding of the connector while the SMA element 2 is being pre-stressed can also be ensured by a guiding connecting link 33 of the kind described above. However, a guiding in the direction mentioned above can also be accomplished solely with the help of a protuberance 37 and an opening 14 of the connector 4 executed as long hole 27. To do this, the protuberance 27 must have a width 32 corresponding to the long hole 27 but a shorter length 44 than the long hole 27 (FIG. 7). As a result of this, when the SMA element 2 is being pre-stressed in width direction, the connector 4 is fixed in width direction on the protuberance 37 in longitudinal direction 28 of the wire end 3 but can be moved.

Preferably, the connector 4 is fixed on the structural part 5 by hot caulking the protuberance 37. Thus, it is softened by a stamp tool and deformed in such a way that the softened plastic material 15 fills at least partially the opening 14 of the connector 4 while creating a form- and/or force-fitting connection.

The handling of the connector 4 for the purpose of positioning and pre-stressing the SMA element 2 is made easier by the grip element 16 arranged on the connector. The grip element 16 (which can be plate-shaped, for example) is removed once assembly of the SMA element 2 has been completed. To simplify the detachment of the grip element 16 from the remaining connector 4, a separating area 45 has been provided, executed generally as a weakening of the material, specifically as a thin connecting bridge. The grip element 16, preferably larger and wider than the connector 4, has a control element 47 that acts together with a handling tool 42 (FIG. 8). The control element 47 is preferably made up of two recesses 48 that intersperse the grip element 16. Two cogs 49 of the handling tool 42 can be plugged into the recesses 48. To ensure a secure holding of the grip element 16, it is convenient for the cogs 49 to intersperse the recesses 48, in which case they protrude with a projection 50 from the side of the grip element 16 that faces the structural part 5. So this can be accomplished without interference, a depression or recess 53 has been provided on the structural part, in which the projections 50 of the cogs can project inward.

The invention claimed is:

1. Actuator with a movable controlling element (7), a wire-shaped SMA element (2) for the unidirectional movement of the controlling element on whose at least one wire end (3) a connector (4) made of an electrically conducting material and having a contact surface (13) has been fixed, and provided with a structural part (5) made at least partially from non-conductive plastic material that has a conductive strip (6), characterized in that the connector (4) is fixed to an area of the structural part made from the non-conductive material, whereby as a result of this, the contact surface (13) is maintained in electrically conducting contact with the conductive strip (6).

2. Actuator according to claim 1, characterized in that the plastic material of the structural part (5) is a thermoplastic material.

3. Actuator according to claim 1 or 2, characterized in that the connector (4) is interspersed by an opening (14) filled at least partially with plastic material (15) of the structural part (5).

4. Actuator according to claim 3, characterized in that the opening (14) ends in the contact surface (13), and that the conductive strip is held firmly by an opening (43) connected to the recess through which plastic material (15) of the structural part (5) extends into the opening (14) of the connector (4).

5. Actuator according to claim 3 or 4, characterized in that the opening (14) is a long hole (27) that extends in longitudinal direction of the wire end (3).

6. Actuator according to one of the preceding claims, characterized in that there is a guiding connecting link (33) on the structural part (5) that at least partially contains the connector and extends in longitudinal direction (28) of the wire end (3).

7. Actuator according to claim 6, characterized in that the guiding connecting link (33) is formed by a groove (35) with two opposite groove walls (34) that flank the connector (4).

8. Actuator according to one of the preceding claims, characterized in that the connector (4) supports itself spring-like with its contact surface (13) on the conductive strip (6).

9. Actuator according to claim 8, characterized in that the connector (4) comprises a leaf spring (23) bent in an arched way whose side (24) facing the conductive strip (6) rests at least partially on the contact surface (13).

10. Actuator according to one of the preceding claims, characterized in that the connector (4) comprises a crimp element (18) with which it is fixed to the wire end (3).

11. Actuator according to one of the preceding claims, characterized in that the connector (4) is executed as one single piece with the wire end (3).

12. Actuator according to one of the preceding claims, characterized in that the structural part (5) is an MID structural part.

13. Method for manufacturing an actuator (1) according to one of the preceding claims, that includes the following steps:
    a) An SMA element (2) is provided and a connector (4) has been arranged on at least one of its wire ends (3),
    b) The SMA element is positioned on the actuator in such a way that the contact surface (13) of the connector (4) makes contact with the conductive strip (6) of the structural part (5),
    c) The SMA element (2) is pre-stressed by impinging the wire ends (3) with a tensile force (Z),
    d) As soon as the target pre-stress of the SMA element (2) is reached, the connector (4) is fixed on the plastic material of the structural part (5).

14. Method according to claim 13, characterized in that a structural part (5) is used that is made at least partially of a thermoplastic material, in which case a portion of the plastic material is softened by the action of heat and thus deformed in such a way that a form- and/or force-fitting connection is created between it and the connector (4).

15. Method according to claim 14, characterized in that a structural part (5) is used that has a protuberance (37) made of thermoplastic material that is softened and deformed for fixing the connector (4).

16. Method according to claim 15, characterized in that the connector (4) is positioned in such a way on the conductive strip (6) that the protuberance (37) intersperses the opening (14) of the connector (4).

17. Method according to one of the claims 13 to 16, characterized in that a connector (4) is used on which a grip element (16) is arranged, in which case the connector (4) is gripped on the grip element (16) for pre-stressing the SMA element (2).

18. Method according to claim 17, characterized in that a connector (4) is used in which the grip element (16) is arranged on the side that faces away from the SMA element (2).

19. Method according to claim 17 or 18, characterized in that the grip element (16) is detached after the connector (4) has been fixed to the structural part (5).

* * * * *